United States Patent [19]

Reuter

[11] 3,814,155
[45] June 4, 1974

[54] TOOL HEADS FOR USE IN MACHINING TIMBER

[75] Inventor: Alfred Reuter, Oberkirch/Baden, Germany

[73] Assignee: Gebruder Linck, Baden, Germany

[22] Filed: Nov. 16, 1972

[21] Appl. No.: 307,297

[30] Foreign Application Priority Data
Nov. 27, 1971  Germany............................ 2158913

[52] U.S. Cl.................. 144/219, 144/118, 144/176, 144/251
[51] Int. Cl.............................................. B27c 1/08
[58] Field of Search .......... 144/218, 219, 220, 223, 144/231, 240, 162 R, 162 B, 176, 118, 39, 221, 234; 241/251

[56] References Cited
UNITED STATES PATENTS

| | | | |
|---|---|---|---|
| 2,949,946 | 8/1960 | Johnson........................ | 144/219 X |
| 3,190,326 | 6/1965 | Standal......................... | 144/118 X |
| 3,330,315 | 7/1967 | Tomlinson .................... | 144/162 R |
| 3,361,167 | 1/1968 | Farnsworth.................... | 144/176 |
| 3,627,005 | 12/1971 | Morton et al................... | 144/39 |
| 3,645,308 | 2/1972 | Nilsson ......................... | 144/176 |

FOREIGN PATENTS OR APPLICATIONS
45,401   3/1917   Sweden

Primary Examiner—Andrew R. Juhasz
Assistant Examiner—W. D. Bray
Attorney, Agent, or Firm—Browne, Beveridge, DeGrandi & Kline

[57] ABSTRACT

The present specification discloses a tool head for use in machining timber trunks into beams and/or planks. The tool head is in the form of a truncated cone, hacking blades being attached to its periphery and extending over a generating line of the cone. Finishing blades which are provided on and project from the smaller area end of the conical head, are arranged in groups, the cutting edges of the finishing blades in a group being aligned substantially parallel to each other and a group of finishing blades being located between each two hacking blades. The tool head can be rotatably driven about its longitudinal axis, the finishing blades in each group being graduated along the axis of the tool head in such a way that each successive finishing blade when used on a timber trunk, is closer to the timber trunk than the preceding finishing blade taken in the direction of rotation of the tool head. The hacking blades process the side segments of a timber trunk as the trunk is passed over the smaller area end of the rotating tool head, in a direction perpendicular to the rotational axis of the tool head and the finishing blades smooth the even surface produced on the timber trunk.

6 Claims, 3 Drawing Figures

PATENTED JUN 4 1974 3,814,155

TOOL HEADS FOR USE IN MACHINING TIMBER

The present invention relates to a tool head for use in machining timber into beams and/or planks, and for thus producing useful shavings.

More particularly the present invention relates to a tool head having hacking blades arranged on its circumference for processing the side segments of round timber trunks as the trunk is passed along the tool head in a direction perpendicular to the axis of rotation of the tool head, the tool head having blades arranged on the perimeter of its front or working face for smoothing the even surface required to be produced on the timber trunk. Planks, scantlings etc. can be worked in this manner.

During the cutting of the side segments of a round timber trunk, i.e., the so-called profile cutting, for producing beams, planks etc., an even surface is formed on the processed timber, while the timber parts which have been cut off, are processed into useful shavings, for instance wood chips, for cellulose production or chipboard production. Usually the tool heads used for this process are shaped like a truncated cone and the hacking blades are situated on the conical surface, their foremost front edges producing the even surface on the trunk. During this process, especially in the region of branches on the timber, bundles of fibre are frequently ripped out and this leads to unevenness in the machined surface. One of the reasons for the tears and the poor surface quality is the rough chip removal by the hacking blades, which must operate partly against the fibre grain. Tears arise particularly often in the case of timber which has many branches and twisted growth.

In order to raise the surface quality of the even surface produced and to eliminate tears, it is known practice to arrange finishing blades round the circumference of a front or working face of the tool head, these blades smoothing the even surface of the timber (Deutsche Offenlegungsschrift 1,955,293). During this process, short shavings are produced. These finishing shavings are perhaps not suitable as useful shavings on account of their very short fibre length. They represent an undesirable by-product of the shavings quantity produced. On the other hand, the smoothing of the even surface of the timber is a necessary step because the quality of the surface produced by the hacking blades is too poor for serviceable timber, especially when only a few, large hacking blades are used.

The present invention therefore sets out to construct a tool head of the type mentioned, of such a kind that an even timber surface of high quality is obtained and the fibre length of the finishing shavings still enables them to be useful.

According to the present invention there is provided a tool head rotatable about its longitudinal axis for machining round timber trunks comprising a working front end of the tool head, hacking blades arranged on the periphery of the tool head, finishing blades being arranged in groups of several blades in the region of the perimeter of the working front end of the tool head, a group of finishing blades being located between each two hacking blades, the finishing blades in each group having their cutting edges aligned substantially parallel to each other and being graduated along the longitudinal axis of the tool head in such a way that each successive finishing blade when used on a timber trunk, is closer to the timber trunk than the preceding finishing blade taken in the direction of rotation of the tool head, the hacking blades processing side segments of a timber trunk as the trunk is passed over the working front end of the tool head when rotating, in a direction perpendicular to the rotational axis of the tool head and the finishing blades smoothing the even surface produced on the timber trunk.

The effect of the axial graduation of the finishing blades is that, between the attacks of two hacking blades, several finishing blades attack the timber one after another and each removes a shaving, which is as long as possible but thin enough to obtain a high quality surface.

In a preferred embodiment of the present invention, with hacking blades arranged on the case of a truncated cone, the cutting edges of the hacking blades extend over the entire breadth of the truncated cone case approximately following a generating line of the cone case and the first finishing blade of a group is situated with its radially outermost, front cutting corner lying on the cone described by the previous hacking blade cutting edge. This has the result that the first finishing blade, which is axially the furthest set back, starts the removal of shavings from the timber surface produced by the previous hacking blade; the next finishing blade, which has a slight axial projection, removes the next shaving and so on, until the last finishing blade of a group which projects the furthest, removes the last shaving, thereby producing the desired smooth surface on the timber.

In a further embodiment of the present invention, the radially outermost, front cutting corners of the finishing blades of a group are situated on a curve forming a spiral which can be seen when the front or working face of the tool head is viewed along an axis transverse to the plane of that face, each subsequent finishing blade being radially set inwardly of and behind the previous finishing blade. As a practical measure, the radial difference between the first and the last finishing blade of a group is equal to the length of timber fed between the attacks of two hacking blades working in sequence on the timber, so that the radially outermost attacking point of the finishing blades is set back radially inwards during the turning of the tool head at the same rate that the timber is fed through. This has the effect that the attacking point of all the finishing blades in a group is not displaced relative to the timber beam in the latter's longitudinal direction, so that the finishing blades bite one after another deeper into the timber in a direction perpendicular to the timber's length, without the removal of shavings by the finishing blades being adversely affected by the continuous feed movement of the timber.

It is, of course, known practice (Swedish Patent No. 45401) to provide a circular saw disc on the front side of a truncated cone-shaped tool head fitted with hacking blades on its cone case, the teeth of which circular saw disc protrude radially past the surface of the cone case containing the hacking blade cutters. By using this method, tears, as a result of the action of the hacking blades, in the relatively good surface produced by the circular saw can be avoided, but the length of the fibre of the sawn shavings is so small that they cannot be usefully used and they represent an undesirable admixture to the useful shavings produced. Moreover, it has been proven that the optimum speed of rotation of the tool head for the action of the hacking blades is too low for the circular saw to operate satisfactorily.

The present invention will now be further described, by way of example, with reference to the accompanying drawings in which.

Figure 2:
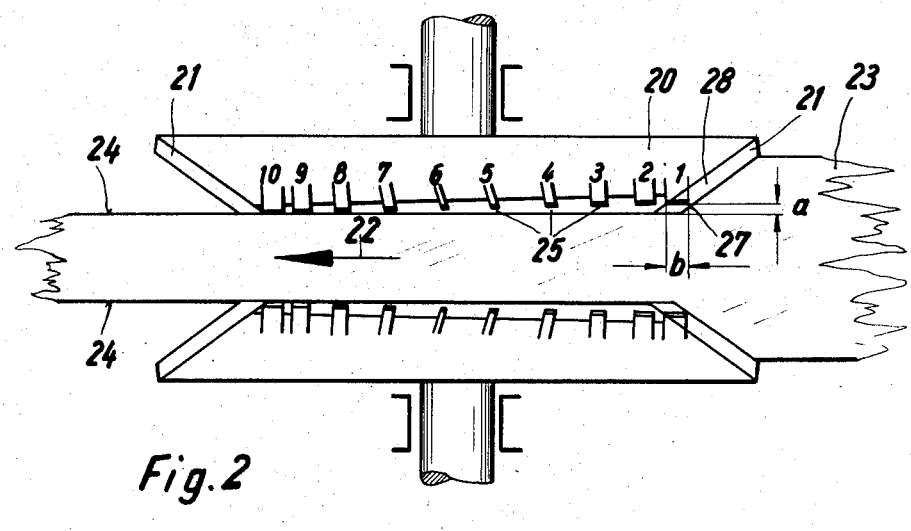
FIG. 2 is a side view of two tool heads each as per FIG. 1, the tool heads being arranged to cut a round timber trunk from two opposed sides.

On the truncated cone-shaped outer surface of the rotary, driven tool head 20 there are two hacking blades 21, which produce useful shavings, for instance wood chips for cellulose production, from the side segments of the round timber trunk 23 as it is fed perpendicularly to the tool head axis in the direction of the arrow 22 (FIG. 2). After the round timber trunk 23 has passed between the two tool heads 20, a form is produced which has been worked on two opposite sides and can be further processed into a beam, planks or the like.

Finishing blades 1 to 10 and 1' to 10' respectively, are accommodated on the front face on the circumference of the tool head 20 between the hacking blades 21. The finishing blades are used to machine the even surface 24 produced on the timber trunk 23. Each finishing blade has a cutting edge 25 running parallel to the even surface 24 of the timber. These cutting edges 25 are - as can be seen from FIG. 2 - sequentially graduated axially of the tool head and the finishing blades in the embodiment shown in FIGS. 1 and 2, form two groups. In each group, the first finishing blade 1 or 1' taken in the direction of rotation of the blade head 20 as indicated by arrow 26, is axially the furthest set back relative to the front of the tool head; the next finishing blade 2 or 2' projecting axially slightly further from the front of the tool head, i.e., towards the timber trunk, and so on; the finishing blade 10 or 10' projecting axially the furthest. The axial difference $a$ between the first and the last finishing blade of a group corresponds to the greatest possible depth of the timber to be cut by the finishing blades.

The cutting edges of the hacking blades 21 run over the entire breadth of the cone case of the tool head 20 along a cone generating line. The first finishing blade 1 or 1' of a group is situated with its radially most extreme, corner 27 of its cutting edge, on the cone 28 described by the preceding hacking blade cutting edge.

Figure 1:
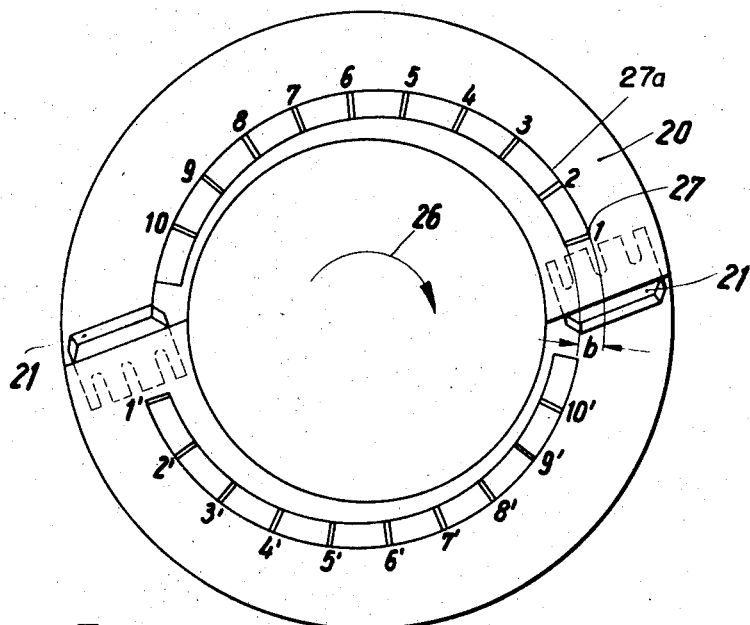
FIG. 1 is a front view of one embodiment of a tool head constructed in accordance with the present invention.

As can be seen from the front view in FIG. 1, the finishing blades 1 to 10 of the first group and 1' to 10' of the second group each lie on a spiral, whereby each subsequent finishing blade is radially set inwardly of and behind the previous finishing blade. Considering the spiral arrangement seen in FIG. 1 and the axial graduation seen in FIG. 2 together, it can be seen that the radially most extreme, front cutting corners (e.g. 27 next to finishing blade 1) of one group of finishing blades are situated on a common cone spiral line 27$a$, which extends halfway round the circumference of the tool head 20.

Figure 3:
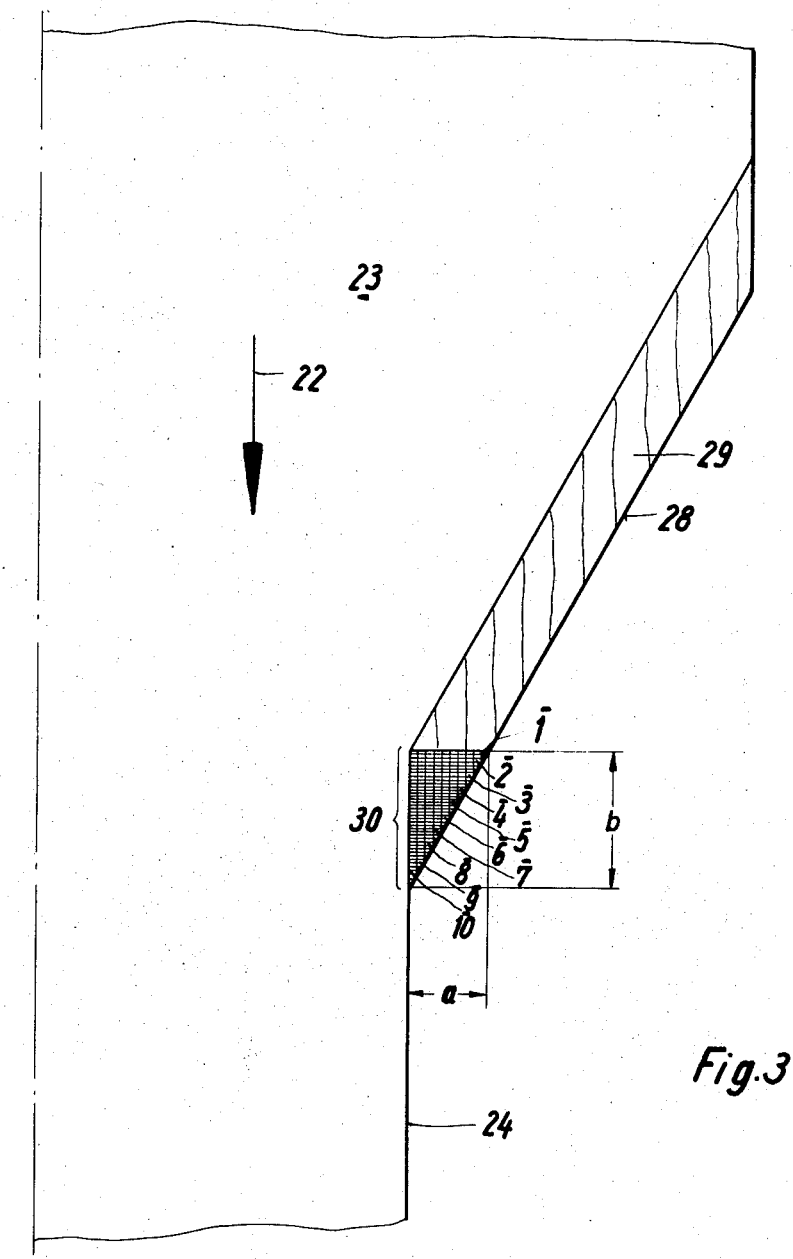
FIG. 3 is a longitudinal sectional view through a timber trunk, which has been cut by a tool head according to FIGS. 1 and 2.

The effect of this arrangement can be seen in FIG. 3. In the longitudinal section through the timber trunk 23, the area 29 illustrated, is cut by the action of a hacking blade 21. Before this happens, a triangular area 30 is cut by the finishing blades 1 to 10 of a finishing blade group into flat shavings parallel to the even timber surface 24 to be produced. The shavings removed by the individual finishing blades are labelled in FIG. 3 with the same reference numerals as the respective finishing blades of this group only with a cross-bar above; thus, for example, the shaving $\bar{1}$ is cut by finishing blade 1, the shaving $\bar{2}$ by finishing blade 2 and so on. As the successive finishing blades in a group are radially set further inwardly of the tool head perimeter, the finishing blades cut, independently of the feed movement of the trunk 23 in the direction of the arrow 22, perpendicular to the feed direction of the timber, without the timber being pressed by its feed movement against the finishing blades. For this purpose, the spiral which can be seen in the front view is formed in such a way that the radial difference between the first finishing blade 1 or 1' and the last finishing blade 10 or 10' of each group is equal to the length of timber fed in the direction of arrow 22 between the attacks of both hacking blades 21 working in sequence.

Only after the last finishing blade 10 has removed the shaving $\overline{10}$ and so produced the smooth surface 24, is the timber area 29 cut up by the hacking blade 21 into shavings or wood chips. To prevent surface cracks from the area 29 penetrating into the even surface 24, the breadth $b$ of the area 30 worked off by the finishing blades, $b$ corresponding at the same time to the radial difference between the first and the last finishing blade of a group, is so chosen to correspond at least to the thickness of the area 29, removed by the hacking blades 21 and measured lengthways along the timber trunk, and so to the length of timber fed in the direction of arrow 22 between the instances when the two hacking blades 21 engage the timber, working in sequence. The axial difference $a$ between the first and the last finishing blade of a group is at least equal to the thickness of the area 29 cut by a hacking blade 21 and measured in an axial direction of the tool head 20. The feed speed of the timber trunk 23 is selected in dependence upon the rotation speed of the tool head 20 and the number of hacking blades 21 so that the timber trunk is fed through by exactly the depth to be cut by a hacking blade before the next hacking blade is applied.

The action of the finishing blades as described with reference to FIG. 3 can also be defined as the finishing blades operating in advance of the hacking blades since the finishing blades first of all cut the area 30, which is triangular in section, completely off, before a hacking blade attacks the timber to process the remaining area 29 into wood chips. It is also clear from FIG. 3 that the shavings $\bar{1}$ to $\overline{10}$ cut by the finishing blades each have the greatest possible fibre length, which, admittedly, is smaller on average than the fibre length in the area 29 but, nevertheless, is sufficiently great to use the shavings $\bar{1}$ to $\overline{10}$ serviceably with the other shavings.

In the illustrated embodiment, one edge of the area 29 held by a hacking blade extends to the surface 24. To ensure that no kind of tear occurs at this point also, it is possible to increase the size $b$ of the area 30 still more so that the area 29 in no way extends as far as the surface 24.

In the section, illustrated in FIG. 3, of the timber area 30 cut by the finishing blades, the shavings $\bar{1}$ to $\overline{10}$ are basically broken away by the main cutting edges 25 of the finishing blades 1 to 10 or 1' to 10', the main cutting edge 25 being parallel to the surface 24. I claim:

1. A tool head rotatable about its longitudinal axis for machining round timber trunks comprising a working front end of the tool head, hacking blades arranged on the periphery of the tool head, finishing blades being arranged in groups of several blades in the region of the perimeter of the working front end of the tool head, a group of finishing blades being located between each two hacking blades, the finishing blades in each group having their cutting edges disposed in substantially parallel planes perpendicular to the axis of rotation of the tool head and being graduated along the longitudinal axis of the tool head in such a way that each successive finishing blade when used on a timber trunk, is closer to the timber trunk than the preceding finishing blade taken in the direction of rotation of the tool head, the hacking blades processing side segments of a timber trunk as the trunk is passed over the working front end of the tool head when rotating, in a direction perpendicular to the rotational axis of the tool head and the finishing blades smoothing the even surface produced on the timber trunk.

2. A tool head according to claim 1, wherein a truncated cone case on the periphery of which are located the hacking blades, forms the tool head, the cutting edges of the hacking blades extending over the entire depth of the truncated cone case following approximately a generating line of the cone case, a first finishing blade of a group, taken in the direction of rotation of the tool head, being situated with its radially outermost corner of its cutting edge, lying on the cone described by the preceding hacking blade cutting edge.

3. A tool head according to claim 1, wherein the radially outermost corners of the cutting edges of the finishing blades of a group, are situated on a curve which is seen to be a spiral when the front end of the tool head is viewed in a direction parallel to the longitudinal axis of the tool head, each successive finishing blade being set radially inwardly of and behind the preceding finishing blade taken in the direction of rotation of the tool head.

4. A tool head according to claim 2, wherein the radially outermost corners of the cutting edges of the finishing blades of a group, are situated on a curve which is seen to be a spiral when the front end of the tool head is viewed in a direction parallel to the longitudinal axis of the tool head, each successive finishing blade being set radially inwardly of and behind the preceding finishing blade taken in the direction of rotation of the tool head.

5. A tool head according to claim 3, wherein the radial difference between the first finishing blade of a group and the last finishing blade in the group is chosen to be equal to the length of timber fed to the tool head between the instances when two successive hacking blades working in sequence engage with the timber.

6. A tool head according to claim 4, wherein the radial difference between the first finishing blade of a group and the last finishing blade in the group is chosen to be equal to the length of timber fed to the tool head between the instances when two successive hacking blades working in sequence, engage with the timber.

* * * * *